Patented Oct. 21, 1930

1,779,279

UNITED STATES PATENT OFFICE

PAUL LAEUGER, OF BASEL, SWITZERLAND, ASSIGNOR TO THE FIRM: J. R. GEIGY L. A., OF BASEL, SWITZERLAND

MANUFACTURE OF ACID DYESTUFFS OF THE PHENONAPHTHOSAFRANINE SERIES

No Drawing. Application filed September 7, 1928, Serial No. 304,618, and in Germany September 21, 1927.

This invention is an improvement in or modification of the process for the manufacture of dyestuffs of the phenonaphthosafranine series described in U. S. patent specification Ser. No. 166,021, filed February 4, 1927.

By the present invention valuable acid dyestuffs of the phenonaphthosafranine series are made by introducing by means of a sulphonating agent further sulpho-groups into a phenonaphthosafranine-16-mono-sulphonic acid insoluble in water of the general formula:

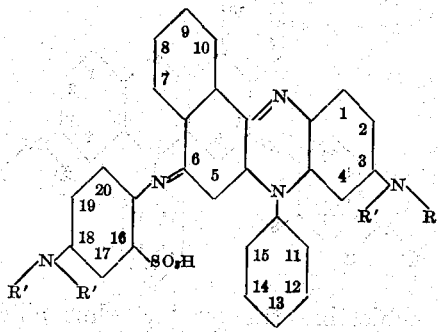

in which R stands for aralkyl or aryl, R' for hydrogen, alkyl, aralkyl or aryl.

The new dyestuffs contain the one sulphogroup in the position 16 which brings about the good fastness to alkali of the dyeings on wool obtained by means of them, while the further sulpho-groups introduced are in the external benzene nucleus of the azinechromogen. Since the dyeing properties and fastness properties of the acid dyestuffs of this series are strongly influenced by the number and the positions of the sulpho-groups and since hitherto only such sulphonic acids with the sulpho-group in 16-position have been made, which contain the remaining sulpho-groups in the stock aryl nucleus of the azinechromogen (see U. S. patent specifications Ser. No. 166,121, filed February 4, 1927, Ser. No. 248,566, filed January 28, 1928, and Ser. No. 253,217, filed February 9, 1928) it could not be foreseen whether valuable dyestuffs could be produced by the present method. There are in fact obtained acid wool-dyestuffs which approximate the products described in the aforesaid specifications in respect of the pure blue tints and fastness to alkali and light of their dyeings but superior to the said products in their much better fastness to fulling.

The safranine-16-monosulphonic acids serving as parent material may be made as described in U. S. specification Ser. No. 166,021, filed February 4, 1927, from the corresponding isorosinduline-6-sulphonic acids by exchanging the 6-sulpho-group for an unsymmetrical N-alkylated para-phenylene-diamine-sulphonic acid, in which the ortho-position to the free amino-group is occupied by the sulpho-group.

These safranine-16-monosulphonic acids are dyestuffs insoluble in dilute acids or sodium carbonate solutions, soluble in strong acetic acid to blue solutions and in concentrated sulphuric acid to green solutions, but have no technical value.

The following example illustrates the invention:—

52 parts by weight of 6-sulpho-3-ethylbenzylisorosinduline of the formula:

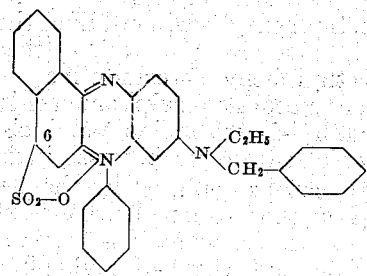

(which may be made by condensation of 2-phenylnaphthylamine with 4-nitroso-1-ethylbenzylaniline, treatment with sodium sulphite and subsequent oxidation) are boiled in a reflux apparatus with 400 parts of alcohol while stirring and 25 parts of sodium 1-methyl-2-ethylamino-5-aminobenzene-4-sulphonate in concentrated aqueous solution are added. After addition of 20 parts of crystallized sodium acetate the whole is boiled until a portion of the product having the formula:

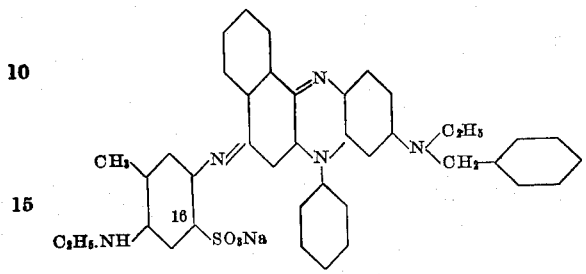

dissolves in sulphuric acid to a green solution. The alcohol is then distilled off and the precipitate washed until free from salt and rapidly dried. For the sulphonation 1 part of the powdered dyestuff is introduced gradually into 5 parts of fuming sulphuric acid of 30 per cent. strength at the ordinary temperature and the mass stirred until a sample dissolves in sodium carbonate solution. The whole is then poured upon ice and the precipitated free dyestuff disulphonic acid is filtered and washed free from sulphuric acid by means of common salt solution. The dyestuff is then dissolved by means of dilute sodium carbonate solution and precipitated from this by salting out. The sodium salt having the formula:

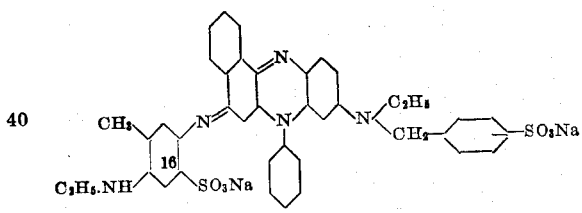

is a dark powder, freely soluble in water to a blue solution. It dyes wool in a feebly acid bath greenish-blue. The dyeings are excellently fast to light, alkali and fulling.

In this example, the 6-sulpho-3-ethylbenzylisorosinduline can be replaced by the 6-sulpho-3-methylbenzylisorosinduline, the 6-sulpho-3-ethylphenylisorosinduline, the 6-sulpho-3-methylphenylisorosinduline or any other isorosinduline-6-sulphonic acid; again, the 1-methyl-2-ethylamino-5-aminobenzene-4-sulphonic acid preferably used in form the sodic salt can be replaced by the 1-methyl-2-methyl-amino-5-aminobenzene-4-sulphonic acid, the 1-ethylbenzylamino-4-aminophenyl-3-sulphonic acid, the 1-diethylamino-4-amino-phenyl-3-sulphonic acid or any other unsymmetrical N-alkylated para-phenylenediamine sulphonic acid having its ortho-position to the free amino-group occupied by the sulpho-group.

What I claim is:—

1. A process for the manufacture of acid dyestuffs fast to alkali of the phenonaphthosafranine series, consisting in subjecting a phenonaphthosafranine-16-mono-sulphonic acid of the general formula:

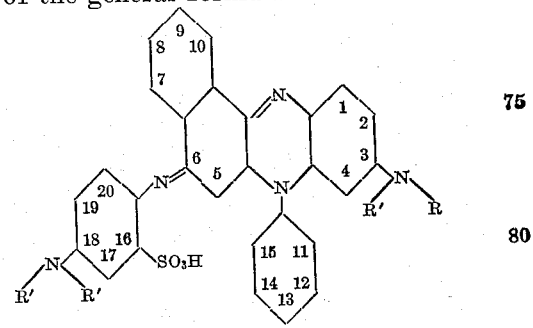

in which R stands for aralkyl or aryl and R' for hydrogen, alkyl, aralkyl or aryl, to a treatment with a sulphonating agent.

2. A process for the manufacture of acid dyestuffs of the phenonaphthosafranine series, consisting in treating an isorosinduline-6-sulphonic acid with an unsymmetrical N-alkylated para-phenylenediamine sulphonic acid having its ortho-position to the free amino-group occupied by the sulpho-group so as to obtain a phenonaphthosafranine-16-mono-sulphonic acid of the general formula:

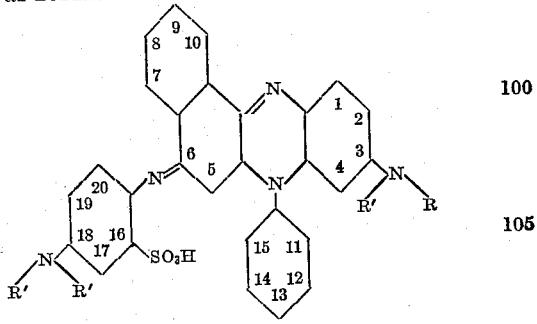

and subjecting the product thus obtained to the action of a sulphonating agent.

3. As new articles of manufacture, the products obtained according to the process above referred to by subjecting a phenonaphthosafranine-16-monosulphonic acid of the general formula:

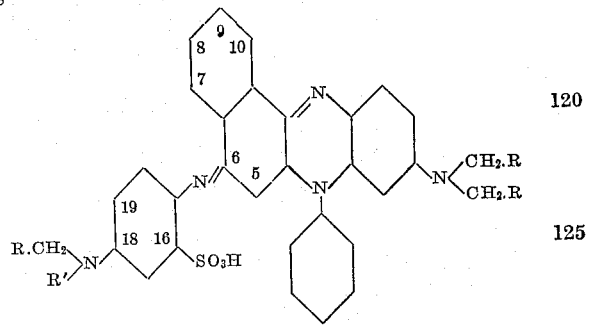

in which R stands for alkyl or aryl and R' for hydrogen, alkyl or aralkyl, to a treatment with a sulphonating agent, said products being valuable acid dyestuffs which in form of their sodium salts are freely soluble in water and dye wool in a feebly acid bath pure-blue to greenish-blue tints.

In witness whereof I have hereunto signed my name this 25th day of August, 1928.

PAUL LAEUGER.